United States Patent Office 3,382,196
Patented May 7, 1968

3,382,196
ORGANIC RUBBERS WITH MERCAPTOOR-
GANOSILOXANES HAVING IMPROVED
ELONGATION
William G. Gowdy and Joseph W. Keil, Midland, Mich.,
assignors to Dow Corning Corporation, Midland, Mich.,
a corporation of Michigan
No Drawing. Filed June 3, 1965, Ser. No. 461,157
6 Claims. (Cl. 260—3)

This application relates to silicone-modified organic elastomers that possess improved elongation without a major loss in tensile strength or toughness.

Elastomers of high elongation are known, but high elongation has typically required a low crosslink density in the elastomer, which results in low tensile strength.

The elastomers of this invention possess a unique combination of properties. These elastomers are intimately-mixed compositions consisting essentially of (1) 100 parts by weight of a nonsiliceous organic elastomer stock which is heat vulcanizable through aliphatically unsaturated groups, and (2) from 1 to 5 parts by weight of an organosilicon compound consisting essentially of (a) ($R_2SiO$) units and at least two (b)

$$\left(\begin{array}{c} HSR'SiO \\ | \\ R_n \end{array}\right)_{\frac{3-n}{2}}$$

units, said (b) units being separated from each other by an average of at least 10 (a) units, where R is a monovalent hydrocarbon or halohydrocarbon radical, free of aliphatic unsaturation, R' is a divalent hydrocarbon radical, free of aliphatic unsaturation, and $n$ has a value of 0 to 2.

Ingredient (1) can be any organic elastomer stock which is not a silicone elastomer stock, and which is vulcanizable through aliphatically unsaturated groups. A good test of the above is whether or not the stock can be vulcanized with sulfur, which is a well-known technique for vulcanizing organic polymers that contain aliphatic unsaturation. Examples of useable polymers are those shown in Example 1, plus polychloroprene and polybutadiene.

The rubber stocks which are useful as ingredient (1) must be vulcanizable. Therefore, sulfur, an organic peroxide, or some other vulcanizing agent must be present in the stock. It is furthermore desirable for a filler to be present, examples of which are silica, carbon black, glass fibers, alumina, or titania. Many varieties of vulcanizable rubber stocks are commercially available.

Other ingredients can be added to the rubber stock as desired. Many potential additives are known to those skilled in the art, e.g. zinc oxide, stearic acid, coumerone-indene resin, glycerine, and other commercial additives.

Ingredient (2) is a copolymer of mercaptoorganosiloxane and diorganosiloxane units as described above.

R can be any monovalent hydrocarbon radical which is free of aliphatic unsaturation, e.g. alkyl and cycloalkyl radicals such as methyl, ethyl, propyl, isohexyl, octadecyl, and cyclohexyl; and aryl-containing radicals such as phenyl, 2-phenylpropyl, tolyl, xenyl and naphthyl.

R can also be any monovalent halohydrocarbon radical which is free of aliphatic unsaturation, e.g. haloalkyl and cycloalkyl radicals such as 3,3,3-trifluoropropyl, 4-chlorooctyl, 1,1,2,2-tetrahydrofluorooctyl, and bromocyclopentyl; and halogenated aryl-containing radicals such as dibromophenyl, $\alpha,\alpha,\alpha$-trifluorotolyl, fluorobenzyl, and trichloroxenyl.

R' can be any divalent hydrocarbon radical which is free of aliphatic unsaturation, e.g. methylene, propylene, isobutylene

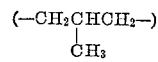

hexamethylene, octadecamethylene,

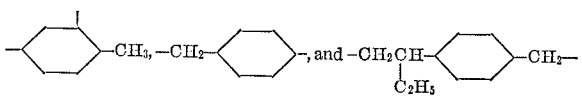

Small amounts of other groups can be present in ingredient (b), for example, silicon-bonded hydroxyl groups, silicon-bonded hydrolyzable groups such as —Cl, —$OCH_3$, —$OC_2H_5$, and

and siloxane units such as $RSiO_{3/2}$ and $R_3SiO_{1/2}$, where R is defined above.

It is preferred for ingredient (2) to be a mercapto-endblocked composition of the formula

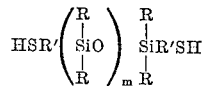

where $m$ has an average value of 10 to 150, and the other symbols are defined above.

It is particularly preferred for ingredient (2) to be of the formula

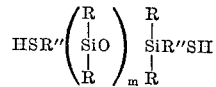

where R'' is a divalent alkyl radical and $m$ has an average value of 10 to 100.

The compositions of this invention are best mixed by milling, which is the standard method for preparing rubber stocks.

The best vulcanization times and temperatures of the compositions of this invention do not differ significantly from those of the corresponding silicone-free rubber stocks. Vulcanization temperatures generally run from 120° to 200° C., and the vulcanization time generally runs from 10 minutes to 1 hour.

The following examples are illustrative only and should not be construed as limiting the invention, which is properly delineated in the appended claims.

EXAMPLE 1

Samples of organic rubber stocks consisting essentially of 100 parts by weight of the polymers shown below, from 40 to 60 parts of finely-divided silica, from 2.5 to 5 parts of zinc oxide, from 1.5 to 6 parts of sulfur, and from 0.5 to 2 parts of stearic acid were compounded on a hot (200° F.) two-roll mill and vulcanized for 45 minutes at 160° C. and 5000 p.s.i.

Identical samples to the above were milled until homogeneous on a hot (200° F.) two-roll mill with 3 weight percent, based on the weight of the rubber stock, of an organosilicon compound of the formula:

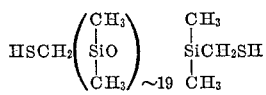

having a viscosity of 52 cs. at 25° C. These samples were cured as above.

The physical properties of these samples were tested and found to be as follows:

| Rubber Stock | | Durometer | Tensile strength, lb./sq. in. | Elongation to break point (percent) |
|---|---|---|---|---|
| (a) | Natural | 81 | 2,060 | 510 |
| | Natural with silicone | 89 | 1,840 | 600 |
| (b) | Ethylene-propylene-cyclohexadiene | 91 | 3,260 | 510 |
| | Ethylene-propylene-cyclohexadiene with silicone | 89 | 3,260 | 630 |
| (c) | Styrene-butadiene and polybutadiene | 87 | 2,515 | 520 |
| | Styrene-butadiene and polybutadiene with silicone | 83 | 2,950 | 660 |
| (d) | Butadiene-acrylonitrile (high nitrile content) | 97 | 3,550 | 285 |
| | Butadiene-acrylonitrile (high nitrile content) with silicone | 98 | 3,500 | 345 |
| (e) | Butadiene-acrylonitrile (low nitrile content) | 83 | 3,860 | 400 |
| | Butadiene-acrylonitrile (low nitrile content) with silicone | 91 | 3,250 | 490 |
| (f) | Butyl | 88 | 1,850 | 650 |
| | Butyl with silicone | 82 | 1,750 | 800 |
| (g) | Styrene-butadiene | 84 | 2,910 | 500 |
| | Styrene-butadiene with silicone | 83 | 3,070 | 660 |

EXAMPLE 2

(a) A composition consisting of 50 g. of a styrene-butadiene rubber base, 20 g. of powdered silica having a surface area of about 270 square meters per gram, 2.5 g. of zinc oxide, 0.15 g. of sulfur, 0.5 g. of magnesium stearate, and 1.35 g. of dicumyl peroxide was rolled on a hot (200° F.) 2-roll mill for 15 minutes. The composition was then cured for 15 minutes at 320° F.

(b) A composition consisting of 100 parts by weight of (a) above and 3 parts of

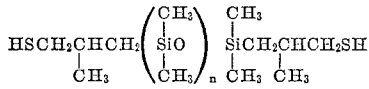

having a viscosity at 25° C. of 440 cs. was milled and cured as above.

The physical properties of the two cured rubbers were as above:

| Rubber | Durometer | Tensile strength 1b/sq. in. | Elongation to break point (percent) |
|---|---|---|---|
| (a) | 83 | 1,030 | 75 |
| (b) | 79 | 990 | 85 |

EXAMPLE 3

When 50 g. of polybutadiene, 15 g. of carbon black, 2 g. of sulfur, and 2.5 g. of an organosilicon compound of the formula

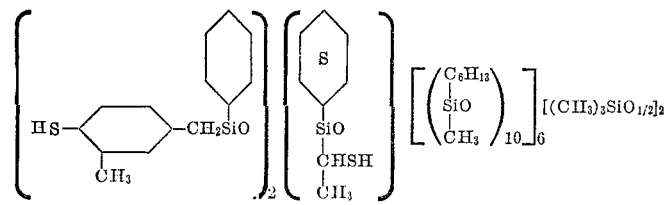

is milled at 100° C. and vulcanized for 15 minutes at 175° C., a cured elastomer having improved elongation is produced.

EXAMPLE 4

When 50 g. of polychloroprene (a polymer of $$CH_2=CCl-CH=CH_2)$$

20 g. of carbon black, 2 g. of sulfur, and 2 g. of an organosilicon compound of the formula

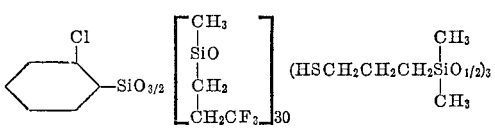

is milled at 120° C. and vulcanized for 15 minutes at 200° C., a cured elastomer having improved elongation is produced.

EXAMPLE 5

When 50 g. of poly(ethylacrylate), 5 g. of polyisoprene, 10 g. of glass fibers, 2 g. of dicumyl peroxide, and 3 g. of

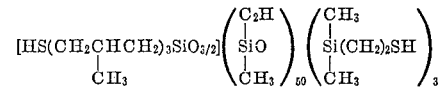

is milled at 150° C. and vulcanized at 175° C. for 20 minutes, a cured elastomer having improved elongation is produced.

That which is claimed is:

1. An intimately mixed composition consisting essentially of
   (1) 100 parts by weight of a nonsiliceous organic elastomer stock which is heat-vulcanizable through aliphatically unsaturated groups, and
   (2) from 1 to 5 parts by weight of an organosilicon compound consisting essentially of
      (a) ($R_2SiO$) units, and at least two
      (b)
      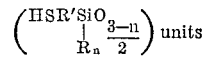 units said (b) units being separated from each other by an average of at least 10 (a) units, where R is a monovalent hydrocarbon or halohydrocarbon radical, free of aliphatic unsaturation, R' is a divalent hydrocarbon radical, free of aliphatic unsaturation, and $n$ has a value of 0 to 2.

2. The cured composition of claim 1.

3. The composition of claim 1 where (2) is of the formula

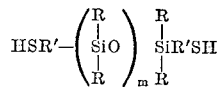

where R is a monovalent hydrocarbon or halohydrocarbon, free of aliphatic unsaturation, R' is a divalent hydrocarbon radical, free of aliphatic unsaturation, and $m$ has an average value of at least 10.

4. The cured composition of claim 3.

5. The composition of claim 1 where (2) is of the formula
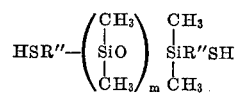
where R″ is a divalent alkyl radical, and $m$ has an average value of from 10 to 100.
6. The cured composition of claim 5.
References Cited
UNITED STATES PATENTS
2,867,603  1/1959  Safford et al. _____ 260—827
SAMUEL H. BLECH, *Primary Examiner.*